(12) United States Patent
Mirghani et al.

(10) Patent No.: US 9,193,608 B2
(45) Date of Patent: Nov. 24, 2015

(54) REMOVAL OF HEAVY METALS FROM AQUEOUS SOLUTIONS USING VANADIUM-DOPED TITANIUM DIOXIDE NANOPARTICLES

(71) Applicants: KING FAHD UNIVERSITY OF PETROLEUM AND MINERALS, Dhahran (SA); KING ABDULAZIZ CITY FOR SCIENCE AND TECHNOLOGY, Riyadh (SA)

(72) Inventors: Mousab Salah Aldeen Mirghani, Najran (SA); Reyad Awwad Khalaf Shawabkeh, Dhahran (SA); Naim Moh'd Abdallah Faqir, Dhahran (SA); Mamdouh Ahmed Al-Harthi, Dhahran (SA); Mohammad Ba Shammakh, Dhahran (SA)

(73) Assignees: KING FAHD UNIVERSITY OF PETROLEUM AND MINERALS, Dhahran (SA); KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 234 days.

(21) Appl. No.: 13/942,611

(22) Filed: Jul. 15, 2013

(65) Prior Publication Data
US 2015/0014253 A1 Jan. 15, 2015

(51) Int. Cl.
*C02F 1/28* (2006.01)
*C02F 1/32* (2006.01)
*C02F 1/74* (2006.01)
*C02F 1/62* (2006.01)
(Continued)

(52) U.S. Cl.
CPC . *C02F 1/281* (2013.01); *C02F 1/32* (2013.01); *C02F 1/725* (2013.01); *C02F 1/74* (2013.01); *C02F 1/62* (2013.01); *C02F 2101/20* (2013.01); *C02F 2305/10* (2013.01)

(58) Field of Classification Search
CPC .............. C02F 1/281; C02F 1/62; C02F 1/32; C02F 1/74; C02F 2305/10; C02F 2101/20
USPC ........................................................ 210/688
See application file for complete search history.

(56) References Cited

U.S. PATENT DOCUMENTS

2006/0210798 A1    9/2006  Burda
2008/0283446 A1*   11/2008 Tatarchuk et al. ............ 208/246
(Continued)

OTHER PUBLICATIONS

Barakat, New trends in removing heavy metals from industrial wastewater, Jul. 2010, Arabian Journal of Chemistry, vol. 4, pp. 361-377.*
(Continued)

*Primary Examiner* — Matthew O Savage
(74) *Attorney, Agent, or Firm* — Richard C. Litman

(57) ABSTRACT

The removal of heavy metals from aqueous solutions using metal-doped titanium dioxide nanoparticles is a method that comprises contacting the aqueous solution with metal-doped titanium dioxide nanoparticles. The three transition metals tungsten, vanadium and iron were selected for doping of titanium dioxide. Removal of the toxic heavy metals Pb(II), Zn(II) and Cd(II) was studied intensively by using metal-doped titanium dioxide to measure the isotherms and kinetics. The isotherms studies showed that the highest removal percentage of Pb(II) was achieved by W-doped titanium dioxide, while Fe-doped titanium dioxide and V-doped titanium dioxide performed better for removal of Zn(II) and Cd(II), respectively.

2 Claims, 3 Drawing Sheets

(51) Int. Cl.
*C02F 1/72* (2006.01)
*C02F 101/20* (2006.01)

(56) References Cited

U.S. PATENT DOCUMENTS

2009/0005238 A1  1/2009  Falaras
2009/0250404 A1  10/2009 Berkowitz et al.
2012/0125844 A1  5/2012  Dongare et al.

OTHER PUBLICATIONS

Doong et al, Microstructural and photocatalytic properties of sol-gel derived vandium-doped mesoporous titanium dioxide nanoparticles, Aug. 2009, Journal of Non-Crystalline Solids, vol. 355, pp. 2302-2308.*

Engates et al, Adsorption of Pb, Cd, Cu, Zn, and Ni to titanium dioxide nanoparticles: effect of particle size, solid concentration, and exhaustion, Aug. 2010, Environmental Science and Pollution Research, vol. 18, pp. 386-395.*

Nabi et al, Evalualtion of the adsorption potential of titanium dioxide nanoparticles for arsenic removal, Jan. 2009, Journal of Environmental Sciences, vol. 21, pp. 402-408.*

Akpan, U.G. et al., "The Advancements in Sol-Gel Method of Doped $TiO_2$ Photocatalysts", Applied Catalysis A: General, 375, 1-11, 2010.

* cited by examiner

REMOVAL OF HEAVY METALS FROM AQUEOUS SOLUTIONS USING VANADIUM-DOPED TITANIUM DIOXIDE NANOPARTICLES

BACKGROUND OF THE INVENTION

1. Field of the Invention

The present invention relates to water treatment methods, and particularly to a method for removal of heavy metals from aqueous solutions using metal-doped titanium dioxide nanoparticles, and particularly to the removal of lead, zinc and cadmium from aqueous solutions by photocatalytic degradation of heavy metals using metal-doped titanium dioxide nanoparticles.

2. Description of the Related Art

In recent years, semiconductors have gained major attention in a vast number of physical and chemical applications such as devices manufacturing and modern electronics. This is because of the unique properties of these materials, including the band gap energy, surface area, pore volume and optical properties.

Among semiconductors, titanium dioxide, which is a white pigment with band gap energy of 3.2 eV, has been used intensively in many industrial applications, such as optical coatings, optoelectronic devices manufacturing, catalyst supports and photocatalysis. This wide range of applications comes as a result of its efficient catalytic activity, photosensitivity, non-toxicity and physical and chemical stability. When irradiated with UV light with energy higher than its band gap, it ejects an electron from the valence band to the conduction band on its surface, which reacts with electron acceptor. This ejection of electrons creates a hole (h+) in the valence band that leads to formation of highly reactive hydroxyl radicals by (h+). In addition, titanium dioxide has many superior characteristics, such as UV shielding capability which makes it an excellent prominent photocatalyst.

Generally, the photocatalytic activity of titanium dioxide is affected by the surface area, pore size and volume, the phase of the solid material, and the band gap energy. Therefore, in order to enhance this photocatalytic activity, it is inevitable to increase the surface area and pore volume of titanium dioxide, where it is hard to control the band gap energy. Thus, nano-level synthesized titanium dioxide can offer a significant improvement of photocatalytic performance.

Several synthetic routes including chemical vapor deposition, hydrolysis, micro-emulsion, template hydrothermal, sputtering and sol-gel synthesis are utilized for the synthesis of nanocrystalline titanium dioxide, and the choice of any of these methods depends on the required properties of the final catalyst and its applications.

The most commonly used techniques for synthesis of titanium dioxide and other semiconductors include the following.

Chemical vapor deposition (CVD): In this process, a substrate is exposed to precursors with higher relative volatility to allow the decomposition on the surface of substrate to produce the desired materials. The main advantage of this process is the ability to produce ultra-high purity materials with a very small particle size. The main drawback of CVD is the low yield.

Sputtering: In this technique, bombardment by energetic particles is used to eject atoms from the solid target materials in a vacuum chamber to produce semiconductors. It is a very efficient method to synthesize nano film with uniform thickness, but it is a high cost process due to the sophisticated equipment required.

Flame synthesis: This process utilizes a high temperature or plasma exposure of precursors to produce small size nano particles. It is commonly used for nano coating due to the mobility of the products as they were achieved by bombardment through the flame.

Because of the drawbacks of these processes, which are the high cost and equipment, the sol-gel technique emerges as the most promising technique due to its simplicity and ability to control the final catalyst properties. This can be attained by adjusting the process parameters, such as the ratio of precursor to acid and solvent, solution temperature, and sonication time.

To make the crystalline titanium dioxide more photocatalytically active, it is required to modify it to enhance both its surface area and photoactive wave length range. To do so, the modifications may include the incorporation of other transition metals oxides into titanium dioxide matrix to promote the catalyst surface in both physical and chemical ways. The transition metals, doped onto the surface of titanium dioxide, improve its photocatalytic activity by reducing the band gap energy. Hence, they make it more active towards the visible range. In addition, these metals prevent surface agglomeration by acting as physical promoters, and may also increase selectivity toward different materials in many applications. This is due to the higher affinity and physical interaction achieved by incorporating these metals.

Many studies have emerged concerning the application of photocatalysis in the field of environmental degradation of chemical pollutants, including organic and inorganic materials, as well as dyes. Toxic metals, which include heavy metals, are individual metals and metal compounds that negatively affect human and animal health. At trace levels, many of these elements are necessary to support life. However, at elevated levels they may build up in biological systems and become a significant health hazard.

Among the class of heavy metals that are classified by Environmental Protection agency (EPA) and Agency for Toxic Substances & Disease Registry (ATSDR), the top priority list of hazardous substances for removal from water includes lead, cadmium and zinc. These heavy metals are carcinogenic and have severe effects on the vital human organs, including lungs, kidneys and blood vessels. The maximum allowable limits of these metals vary according to the local regional regulations, but in general, they are limited to less than 20 ppm in most local regulations. Therefore, removal of these heavy metals from aqueous solution is required to maintain the water quality standards.

Several technological methods could be employed for treatment of water to remove heavy metals. Among these methods are chemical precipitation, ion exchange, membrane separation and adsorption. These methods are either costly, energy consuming or produce sludge that requires further treatment. Photocatalytic application on the other hand has gained major attention in this field, as it offers an efficient removal of a majority of pollutants with low cost of processing, as well as other features, including chemical stability and non-toxicity.

In addition to the conventional elimination of toxic metals from industrial waste effluents, the application of the light-driven processes that can occur on irradiated semiconductor photocatalysts gained in interest for the recovery of precious metals. These metals are reduced on the surface of the semiconductor particle, which is subsequently extracted from the slurry by mechanical and/or chemical means.

A more recent development in photocatalysis is the development of semiconductor nanofibers. These nanofibers have advantages over the regular semiconductors, as they have large surface areas and high reactivates. It can decrease the band gap of $TiO_2$ from 3.2 eV to less than 2.32 eV, which demonstrates higher photo-conversion efficiency by absorbing visible light at wavelengths below 535 nm.

Thus, a method for the removal of heavy metals from aqueous solutions using metal-doped titanium dioxide nanoparticles solving the aforementioned problems is desired.

SUMMARY OF THE INVENTION

The removal of heavy metals from aqueous solutions using metal-doped titanium dioxide nanoparticles is a method that comprises contacting the aqueous solution with metal-doped titanium dioxide nanoparticles. The three transition metals tungsten, vanadium and iron were selected for doping of titanium dioxide. Removal of the toxic heavy metals Pb(II), Zn(II) and Cd(II) was studied intensively by using metal-doped titanium dioxide to measure the isotherms and kinetics. The isotherm studies showed that the highest removal percentage of Pb(II) was achieved by W-doped titanium dioxide, while Fe-doped titanium dioxide and V-doped titanium dioxide performed better for removal of Zn(II) and Cd(II), respectively.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
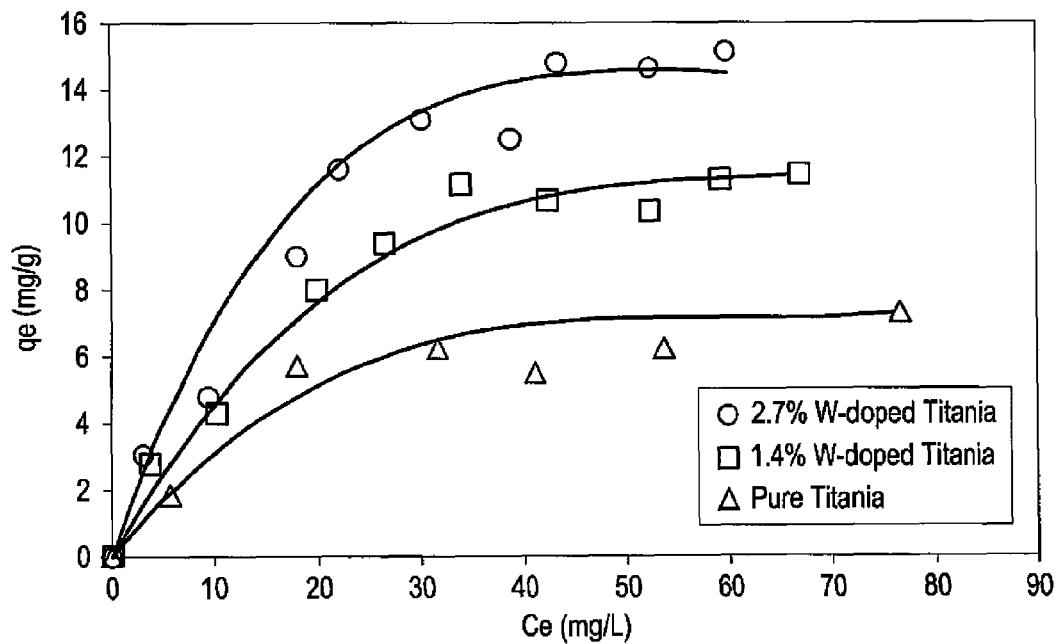
FIG. 1 is a plot showing the adsorption isotherms of zinc onto pure and tungsten-doped titanium dioxide, respectively.

The removal of heavy metals from aqueous solutions using metal-doped titanium dioxide nanoparticles is a method that comprises contacting the aqueous solution with metal-doped titanium dioxide nanoparticles. A modified sol-gel method with continuous ultrasonication was used to synthesize pure and metal-doped $TiO_2$ nanoparticles. The optimum experimental conditions for synthesis of pure nanocrystalline $TiO_2$ were found by Analysis of Variance (ANOVA). These experimental parameters include the amount of water, type of acid, acid concentration and ultrasonication duration. Three transition metals, viz., tungsten, vanadium, and iron, were selected for doping of titanium dioxide at the optimum conditions.

The catalysts were characterized by Scanning Electron Microscopy (SEM), which has shown the spherical shape of particles in the samples obtained at the optimum conditions. The average diameter of these particles ranged from 6-14 nm as measured by Particle Size Analyzer (PSA). X-Ray Diffraction (XRD) analysis was carried out in order to investigate the phase of the catalysts, which was found to be mainly anatase, for all samples calcined at 450° C. The percentage of metals doped on titanium dioxide was measured by Elementary Dispersive Spectroscopy (EDS), which is found to be 2.7%, 1.8% and 1% for tungsten, vanadium and iron, respectively, and the effect of incorporating these transition metals onto titanium dioxide resulted in a significant increase of the surface area as measured by (BET).

The photocatalytic activities of these catalysts were investigated by measuring the degradation of methylene blue from aqueous solutions. It was reported that doping of these transition metals has increased the catalyst maximum uptake 11.5 mg/g for pure titanium dioxide to 17.4 mg/g for V-doped titanium dioxide, 25.6 mg/g for Fe-doped titanium dioxide and 20.8 mg/g for W-doped titanium dioxide. These metal-doped titanium dioxide samples were further applied for removal of Pb(II), Zn(II), and Cd(II) from aqueous solutions, and it was found that the highest removal percentage of Pb(II) was achieved by W-doped titanium dioxide, while Fe-doped titanium dioxide and V-doped titanium dioxide performed better for removal of Zn(II) and Cd(II), respectively.

Titanium dioxide nanoparticles were synthesized using a modified sol-gel technique using different alcohol types and hydrolyzing agents. In a typical run, 5 ml of titanium isopropoxide (99.99%) was added to 25 ml of alcohol at 5° C. with vigorous stirring. Three different types of alcohols; ethanol, methanol, and isopropyl alcohol were used. The resulting solution turned white (Sol) as a result of the formation of hydrolyzed titanium dioxide particles. Another mixture of 25 ml of alcohol with 0.5 ml of hydrolysis agent (either hydrochloric acid or acetic acid) and/or 5 ml of water was prepared and added dropwise to the sol to prevent the sudden formation of the gel, which may lead to incomplete reaction or produce bigger particle size. The mixture was stirred for one hour, followed by ultrasonication for different period of times to prevent any agglomeration of the catalyst to form bigger clusters. The product was dried in an oven for 12 hours at 75° C., followed by crushing and calcination at 300-450° C. for 4 hours. The range of calcination temperature was carefully chosen to avoid the formation of a rutile phase, which appears at calcination temperatures higher than 500° C.

For the synthesis of metal-doped titanium dioxide, the same procedure as for the synthesis of pure titanium dioxide was followed, where water was replaced by a solution of the target metal, the solution being prepared by dissolving the appropriate amount of its original salt in deionized water. Iron (III) nonahydrate, vanadium metavanadate, and tungsten oxide were used as a source for iron, vanadium and tungsten, respectively. In the case of synthesis of tungsten-doped titanium dioxide, a few drops of sulfuric acid were added to prevent any sedimentation during the preparation process. Different solution concentrations of metal ranging between 1000 ppm to 7000 ppm, were used to vary the amount of metal doped on titanium dioxide. This was done while fixing the amount of acid at 0.5 nil, the amount of methanol at 25 ml, and the amount of titanium (IV) isopropoxide at 5 ml.

The produced catalyst was characterized for its shape and morphology using scanning electron microscopy (SEM) (JOEL JSM-6460 LU), where the sample was placed in a semiconductor wafer and electrically grounded to avoid electrostatic charge accumulation. The sample was then coated with a conductive material by low vacuum sputter coating.

The surface area was measured using the Brunauer, Emmett, and Teller technique (BET) (MICROMERITICS-ASAP 2020), in which the sample was placed in a sealed tube and degassed at 80° C. for 20 hours using two vacuum pumps. After that, liquid nitrogen was introduced, and the properties of the samples were measured according to the amount of nitrogen deposited on the surface of the sample.

The crystalline phase and structure were determined using X-Ray diffraction technique (XRD), where the sample was bombarded by electrons produced by heating a filament, and the X-ray spectra was produced when the electrons dislodged the inner shell electrons of the targeted sample. The particle size distribution was determined using a particle size analyzer (PSA) (Microtrac-Zetatrac, MICROMERTICS-S3500), where the sample was heated to 90° C. to remove humidity, and then a compressed air stream is used both as a carrier and a dispersing agent for the dry powder, and the sample was exposed to a laser beam. The particle size was measured according to the properties of the dispersed light.

The amounts of tungsten, vanadium and iron doped into the catalyst matrix were determined using Energy-dispersive X-Ray spectroscopy (EDS) (OXFORD INCAx-SIGHT), attached to the SEM equipment at three different spectra, in which the resolution at 5.9 KeV was 137 eV.

Figure 2:
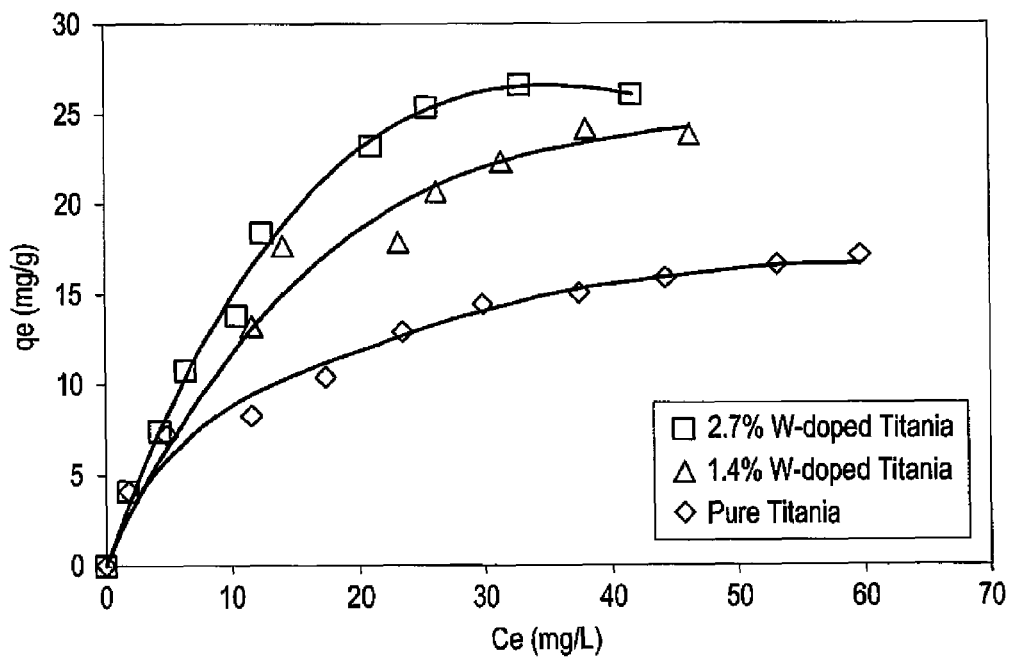
FIG. 2 is a plot showing the adsorption isotherms of lead onto pure and tungsten-doped titanium dioxide.

The effect of titanium dioxide doping with tungsten on the removal of Zn and Pb from aqueous solutions was investigated using different doping percentages of 0% (pure titanium dioxide), 1.4 wt % and 2.7 wt % (maximum doping percentage achieved), where the solution pH was kept constant at 4 for all solutions by using a buffer solution (addition of more tungsten decreases pH, as tungsten oxide is mildly acidic, compared to pure titanium dioxide), and the results are shown in FIGS. 1 and 2 for Zn and Pb, respectively. It can be noticed that the catalyst maximum uptake strongly depends on the amount of tungsten present for both Zn and Pb. The maximum uptake of Pb was found to be more than that of Zn. This trend can be explained by the physical and chemical properties of metal ions, mainly the oxidation state, which results in the ratio of charge to volume. In addition to that, the atomic radius of Zn and Pb, which are 175 pm and 134 pm, respectively, may have a direct result on the adsorption on the catalyst surface.

Figure 3:
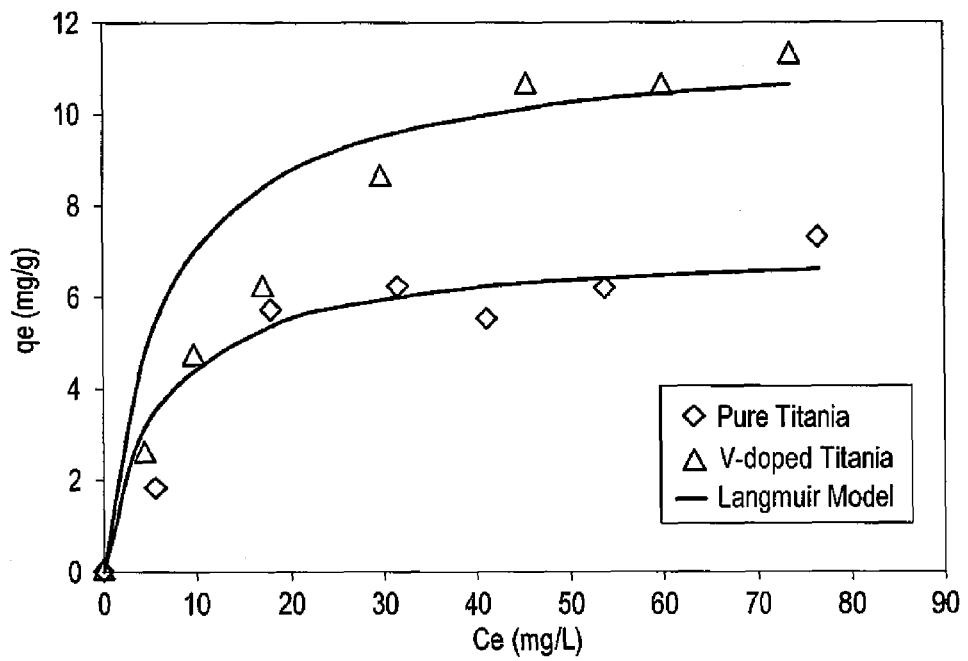
FIG. 3 is a plot showing the adsorption isotherms of zinc onto pure and vanadium-doped titanium dioxide.
Figure 4:
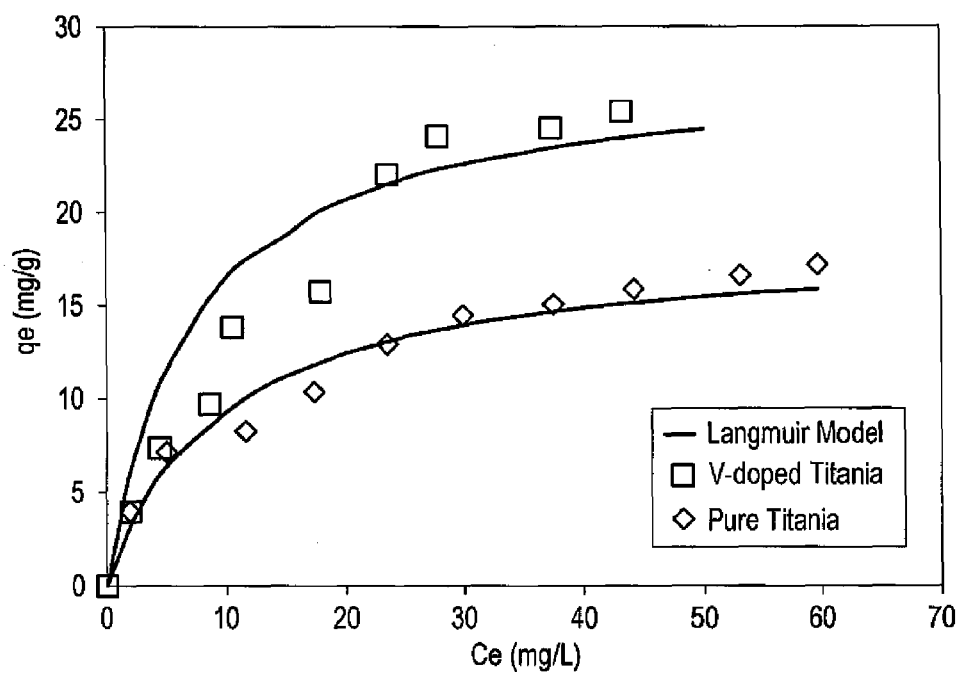
FIG. 4 is a plot showing the adsorption isotherms of lead onto pure and vanadium-doped titanium dioxide.

The adsorption of zinc and lead was studied using pure and vanadium doped titanium dioxide under the same conditions in order to verify the metal uptake using both catalysts. The resulting adsorption isotherms of Zn and Pb are shown in FIGS. 3 and 4, respectively. It is noticed that pure titanium dioxide adsorbs lead more efficiently than zinc. For pure titanium dioxide, a maximum uptake of 7 mg $Zn^{+2}$/g in solid form was obtained, whereas the uptake of Pb increased to 17 mg $Pb^{+2}$/g in solid form for pure titanium dioxide. In the case of vanadium-doped titanium dioxide, the maximum uptake of Zn increased from 7 mg $Zn^{+2}$/g of solid to 11 mg $Zn^{+2}$/g of solid, and for Pb, the maximum uptake increased from 17 mg $Pb^{+2}$/g of solid to 26 mg $Pb^{+2}$/g of solid.

Figure 5:
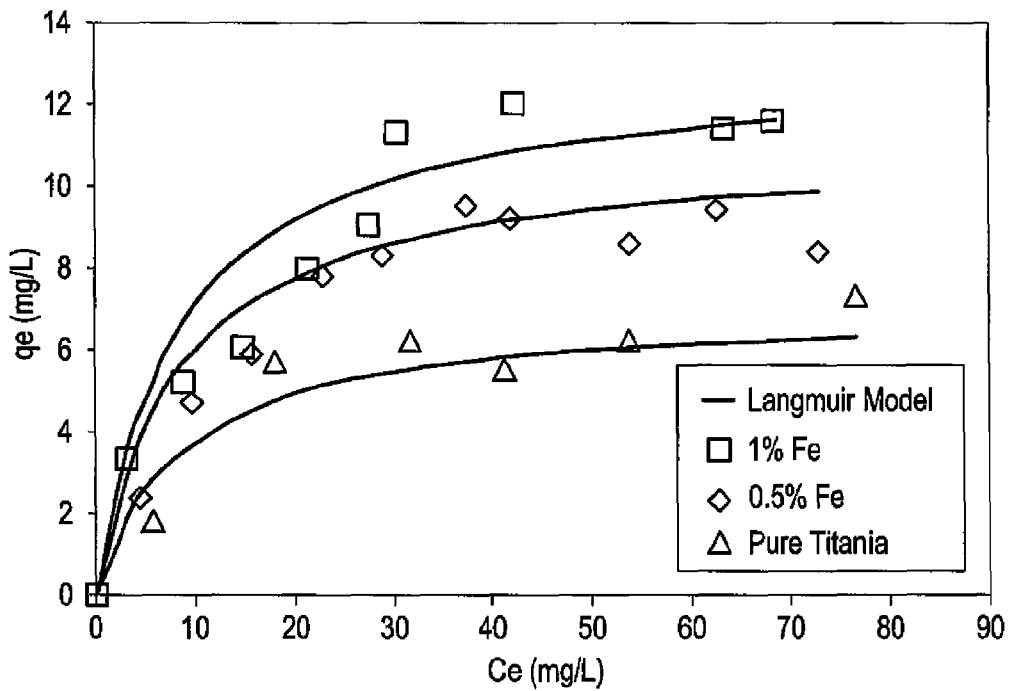
FIG. 5 is a plot showing the absorption isotherms of zinc onto pure and iron-doped titanium dioxide.
Figure 6:
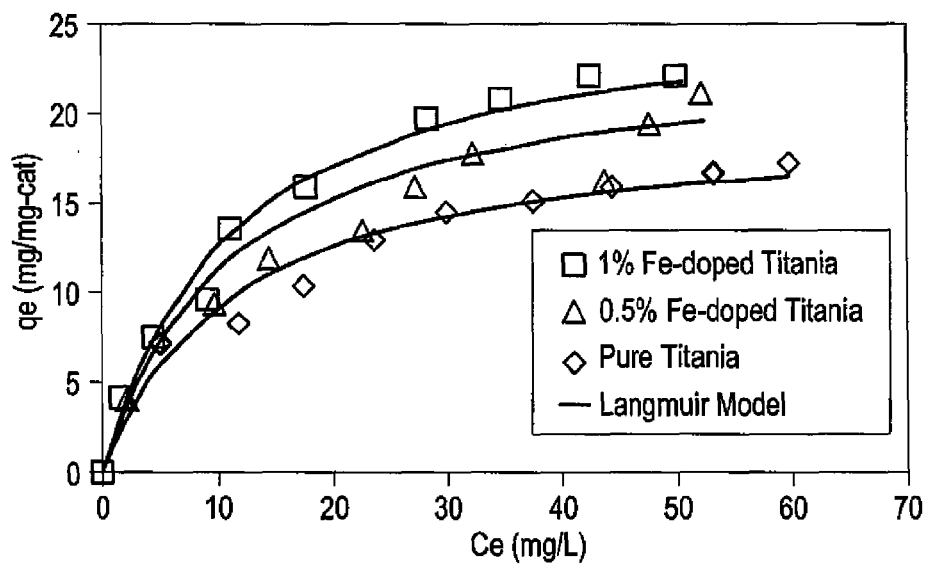
FIG. 6 is a plot showing the absorption isotherms of lead onto pure and iron-doped titanium dioxide.

The effect of titanium dioxide doping on the removal of Zn and Pb from aqueous solutions was investigated using different doping percentages of iron, which are 0% (pure titanium dioxide), 0.5 wt % and 1 wt %. The results are shown in FIGS. 5 and 6 for Zn and Pb, respectively. It can be noticed that the catalyst maximum uptake strongly depends on the amount of iron present for both Zn and Pb. This trend is similar to the one observed for vanadium-doped and tungsten-doped titanium dioxide, which is attributed to the increment on the surface barrier, which eventually makes the electron hole pair more separated, and hence, more efficient.

Removal of the toxic heavy metals Pb(II), Zn(II) and Cd(II) was studied intensively by using tungsten-, iron- and vanadium-doped titanium dioxide to measure the isotherms and kinetics. The isotherm studies showed that the highest removal percentage of Pb(II) was achieved by tungsten-doped titanium dioxide, while iron-doped titanium dioxide and vanadium-doped titanium dioxide performed better for removal of Zn(II) and Cd(II), respectively.

It is to be understood that the present invention is not limited to the embodiments described above, but encompasses any and all embodiments within the scope of the following claims.

We claim:

1. A method for the removal of heavy metals from aqueous solutions, consisting of contacting the aqueous solution with vanadium-doped titanium dioxide nanoparticles.

2. A method for the removal of zinc from aqueous solutions, consisting of contacting the aqueous solution with vanadium-doped titanium dioxide nanoparticles.

* * * * *